2,754,289

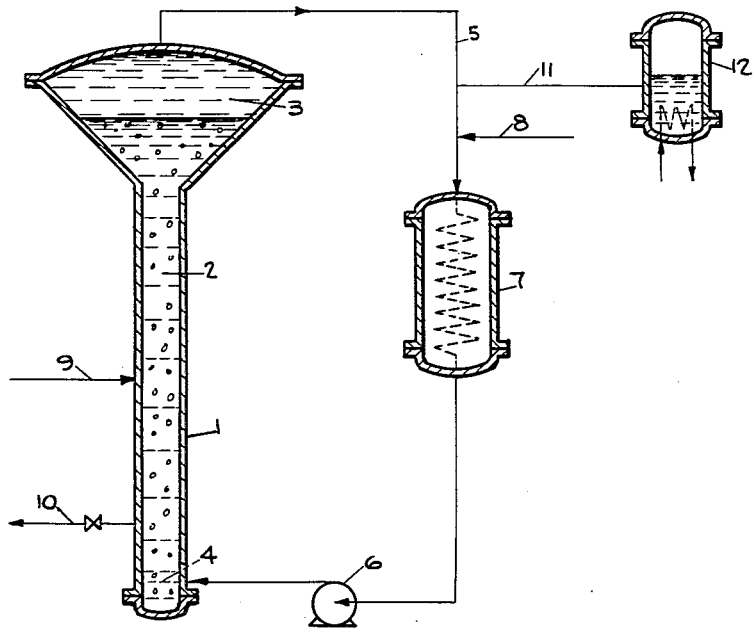
Fig. I
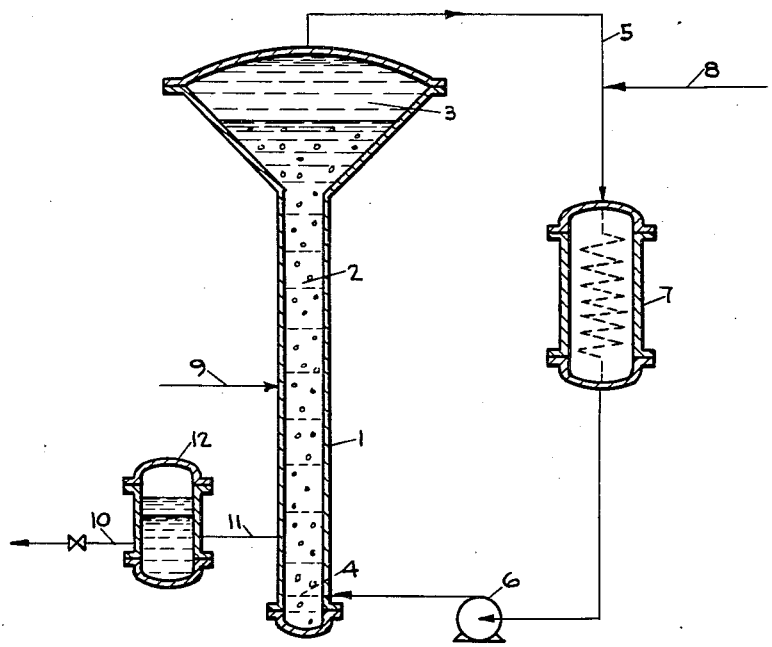
Fig. II
Inventor: Rudolf Herman Mettivier Meyer
By: C. J. Ott
His Attorney United States Patent Office 2,754,289
Patented July 10, 1956

PROCESS FOR POLYMERIZING UNSATURATED COMPOUNDS BY CONDUCTING DROPLETS THROUGH AN AQUEOUS MEDIUM WITH CONTROL OF PRESSURE FLUCTUATIONS

Rudolf Herman Mettivier Meyer, Amsterdam, Netherlands, assignor to Shell Development Company, Emeryville, Calif., a corporation of Delaware Application December 30, 1952, Serial No. 328,730

Claims priority, application Netherlands February 29, 1952

5 Claims. (Cl. 260—87.7)

This invention relates to a process for polymerizing unsaturated compounds in an aqueous medium. More particularly, the invention relates to a process for polymerizing ethylenically unsaturated compounds in an aqueous medium at a temperature above the boiling point of one of the unsaturated compounds.

Specifically, the invention provides an improved process for polymerizing substantially water-insoluble ethylenically unsaturated compounds in an aqueous medium at a temperature above the boiling point of a least one of the unsaturated compounds according to the method disclosed in patent application Ser. No. 201,536, filed December 19, 1950, now U. S. Patent No. 2,618,626, the present process providing an improved technique for controlling pressure fluctuations that might develop in the reaction chamber employed in that process. The improved control over pressure changes is obtained according to the present invention by conducting the process as disclosed in the aforementioned U. S. Patent on a continuous basis wherein monomer is recycled and water phase discharged and then contacting the monomer phase before it is recycled and/or contacting the water phase before it is withdrawn with a liquid which is contained in a separate closed vessel, hereinafter called a pressure vessel, where the liquid is in equalibrium with its own vapor.

In the aforementioned U. S. patent, Ser. No. 201,536, filed December 19, 1950, there is described and claimed a process for polymerizing substantially water-insoluble ethylenically unsaturated monomers in an aqueous medium which comprises conducting drops of the monomer in contact with and through a liquid aqueous medium which contains a water-soluble polymerization catalyst and an emulsifying agent and is being maintained at a polymerizing temperature. The monomer drops that pass through the aqueous medium are collected into a separate monomer phase and transported in continuous fashion outside the chamber filled with the aqueous phase back to the point of supply of the drops. Portions of the polymer-containing aqueous phase are then removed and new aqueous phase added.

The process described in the aforementioned U. S. patent presents many important advantages over known polymerization methods. The process permits, for example, better control over the reaction temperature as the heat of reaction may be removed by cooling the externally circulated monomer rather than by cooling the reaction chamber itself. Secondly, the unique step of circulating the monomer drops through the reaction mixture avoids the necessity of using mechanical stirring and this in turn brings about an improvement in the physical properties of the resulting polymer as well as decreases or eliminates the formation of polymer deposits on the walls of the reaction chamber. Furthermore, the passage of monomer drops through the water provides better control over the concentration of the monomer in the water phase.

The process described in the aforementioned U. S. patent, however, is difficult to operate on a continuous basis at temperatures above the boiling point of the unsaturated compounds. In this case, pressure must be applied to maintain the monomer in the liquid phase and when the water phase containing the polymer is drawn off, there is danger of a drop in pressure and development of monomer vapor in the reaction chamber. The presence of the monomer vapor is undesirable as it obstructs the separation of the monomer from the water phase and this feature is essential to a successful operation of the process.

It has been found that this difficulty as to the fluctuation in pressure exists even when considerable care is taken in removing the water phase and recycling the monomer phase. Thus, even when the supply of materials is regulated so as to maintain the interface of the water phase and the monomer phase at the same level and the discharge of polymer-containing water phase is regulated by automatic means, there is still considerable fluctuation in pressure.

In view of the above difficulty, it has not been convenient to use the process in polymerizing monomers, such as vinyl chloride, which have low boiling points.

It is an object of the invention, therefore, to provide an improved process for polymerizing substantially water-insoluble ethylenically unsaturated compounds in an aqueous medium. It is a further object to provide a process for polymerizing unsaturated compounds in an aqueous medium at a temperature above the boiling point of the unsaturated monomer which process has improved control over pressure fluctuations. It is a further object to prove a process for polymerizing unsaturated monomers in an aqueous medium at temperatures above the boiling point of the monomer which is substantially free of pressure fluctuations due to removal of the aqueous phase and/or recycling of the monomer phase. It is a further object to provide an improved process for polymerizing low-boiling monomers, such as vinyl chloride, in an aqueous medium at temperatures above the boiling point of the monomer. It is a further object to provide a process for producing copolymers in an aqueous medium at temperatures above the boiling point of at least one of the unsaturated monomers.

These and other objects of the invention will be understood from the following detailed description thereof and from the accompanying drawing wherein Fig. I illustrates the embodiment of apparatus for carrying out the process of the invention wherein the monomer phase is contacted with the liquid contained in a separate pressure vessel where it is in equalibrium with its own vapor, and Fig. II illustrates an embodiment of apparatus for carrying out the process wherein the aqueous phase is contacted with the liquid contained in the separate pressure vessel in equilibrium with its own vapor.

It has now been discovered that these and other objects are accomplished by the process of the present invention which comprises effecting the polymerization in the aqueous phase on a continuous basis as shown in the above-mentioned U. S. patent, i. e., by passing liquid drops of the unsaturated monomer through an aqueous medium containing a polymerization catalyst and being maintained at a temperature above the boiling point of the monomer, collecting the drops of monomer as a separate phase at the end of their passage through the medium and recycling a portion of the collected unsaturated compound back to the point of introducing the monomer in the aqueous phase and withdrawing a portion of the polymer-containing aqueous phase, and, to effect the desired control over the pressure fluctuations, contacting the monomer phase before it is recycled as shown above and/or contacting the aqueous phase before it is withdrawn as indicated above, with a liquid which is contained in a separate closed vessel where it is in equilibrium with its own vapor. It has been found that when the process is operated in this manner, there is no danger at all of having pressure fluctuations interfere with the operation of the process. When pressure changes do occur due to the irregularity in discharge or supply of materials, the liquid in the separate vessel will immediately evaporate or condense and arrest the pressure change.

In addition, it has been found that the above-described improvement has been obtained without sacrificing any of the important features of this type of polymerization process, i. e., the process of the invention still possesses improved heat control, avoids the use of mechanical stirring, causes little or no polymer formation on the reaction walls, and yields polymers having improved mechanical properties.

The pressure vessel used to arrest the change in pressure as indicated above is partially filled with a liquid and the rest is filled with the vapor of the liquid. The liquid employed in the vessel may be any liquid which under the conditions present in that part of the apparatus would not undergo polymerization and which may be maintained in equilibrium with its vapor. When the pressure vessel is attached to the monomer recycle line the liquid is preferably the monomer which is circulated through the aqueous phase. When the liquid is the monomer itself, the separate vessel is, of course, kept at a higher temperature than the temperature used in the reaction chamber. If mixtures of monomers are circulated through the aqueous phase, the mixtures may also be present in the separate pressure vessel. If inert liquids, such as pentane, are mixed with or circulated with the monomer or monomers through the aqueous phase, these other liquids may also be present in the pressure vessel.

If the liquid in the pressure vessel is other than the monomer or monomers circulated or liquid circulated with the monomer or monomers, care is preferably taken to see that the liquid is not mixed to any great extent with the water phase or monomer phase. If the liquid of this type is miscible with one of the said phases, this liquid is only allowed to come into direct contact with the other of the said phases. In the event that the liquid in the separate vessel is miscible with both phases, direct contact is prevented by the insertion of a liquid seal, such as a mercury seal, as indicated above.

If the liquid in the pressure vessel is other than that which circulates through the reaction chamber, the temperature in the pressure vessel does not necessarily need to be higher than in the reaction zone. The temperature in the pressure vessel, however, must be equal to the boiling point of the liquid present in the pressure vessel at the desired pressure.

An inert gas may also be present in the vessel above the liquid. It should be present, however, only up to a partial pressure which is less than the difference between the total pressure and the vapor tension of the monomer at the temperature prevailing in the chamber filled with the water phase. The expression "inert gas" as used herein refers to a gas which under the prevailing conditions does not liquefy and is not subject to polymerization or other chemical reactions. The preferred inert gas to be used in the process is nitrogen.

The pressure vessel may be connected with the monomer recycle line where it may come in contact with the monomer and/or it may be connected with the water phase discharge line where it may come in contact with the water phase. If the vessel is connected to the monomer recycle line, there is no danger of polymerization, and the liquid in the vessel may be the monomer itself as described above. If the vessel is connected with the water phase, the liquid should preferably be one that is not polymerizable under the conditions present in the reaction zone. An assembly of apparatus that may be used for carrying out the process of the invention wherein the monomer phase is contacted with the liquid in the pressure vessel and the liquid in the said vessel is the monomer itself is exemplified in Fig. I of the attached drawing. An assembly of apparatus that may be used in carrying out the process of the invention wherein the water phase is contacted with the liquid in the pressure vessel and the liquid in the vessel differs from the monomer is exemplified in Fig. II of the attached drawing.

In the case shown in Fig. II, the liquid in the pressure vessel is lighter than the water phase. In that case, the conduit leading to the pressure vessel as well as the lower part of the pressure vessel will be filled with the aqueous phase. If the liquid is heavier than the water phase then it is desirable to have an intermediate vessel between the reaction zone and the pressure vessel. The intermediate vessel will be partially filled with the liquid and then with the aqueous phase. The part of the intermediate vessel which is filled with the water phase is connected to the reaction chamber. The part of the intermediate vessel which is filled with the liquid is connected to the pressure vessel which has the liquid in equilibrium with its own vapor.

To achieve the improvement in pressure fluctuations to a satisfactory degree, care should be taken that the volume of the vapor and the liquid surface in the pressure vessel are not selected too small.

These dimensions and the excess pressure in respect to the saturation pressure of the monomer phase at the temperature at which polymerization is carried out should in each individual case be selected in connection with the fluctuations in pressure which are to be expected in the apparatus and the method of operation to be adopted. If necessary, simple experiments may serve as a guide in making this choice.

The polymerization of the unsaturated compounds according to the process of the invention is conveniently effected in a reaction chamber which is in the form of a vertical column. The column is nearly filled with the aqueous medium and then the unsaturated monomer is passed through the medium and collected as a separate phase on the top or bottom of the said aqueous medium.

The drops of the unsaturated monomer are preferably added to the aqueous medium through a distributing device containing a plurality of apertures through which the drops may enter the medium. The entrance aperture or apertures can have a diameter of say 0.2 to 20 mm. and are usually 2 to 10 mm. The entering means is placed at one end of the reaction chamber so that the drops flow away from it. At the opposite end, the drops which have passed through the aqueous medium are collected into a separate phase in contact with the said aqueous phase.

The rate of separation of the drops into the monomer phase from the aqueous phase increases with the area of the interface between the two phases. It is, therefore, generally desirable to have the interface positioned in the reaction chamber at a point of largest cross-sectional area. This can be achieved in a column-shaped reaction chamber by having the chamber fitted with a region of enlarged cross-section which is perpendicular to the axis of the flow of drops. This enlarged portion will be located either at the top or bottom of the main column, as the case may require.

The term "drops of monomer" as used throughout the specification and claims means liquid globules of monomer that are of such size that they are clearly visible as distinct entities to the unaided human eye and are thus distinguishable from monomer "droplets" present in the aqueous emulsion processes. The droplets in the emulsion are so small as to be subjected to the Brownian movement, while the drops of monomer in the present invention are so large as to be unaffected by this movement and move through the aqueous medium only by floating or sinking realized from the difference in the density of the drops and the aqueous medium. The drops preferably have a diameter of about 0.1 to 2 centimeters and more preferably from 0.1 to 1 centimeter.

If the unsaturated compound is lighter than the water phase, it will be introduced at the bottom of the column so that the drops might rise through the mixture due to the difference in density of the drops and the medium. On the other hand, if the unsaturated monomer is heavier than the water phase, it will be introduced at the top of the reaction vessel.

The rate at which the drops of monomer are added to the aqueous medium may vary over a considerable range. When the drops are passed through an aqueous emulsion, there is usually at the beginning of the process when little polymer is present in the medium a layer of concentrated emulsion at the interface of separation between the aqueous phase and the monomer layer. Upon continuing the operation until the aqueous phase contains an appreciable proportion of polymer, e. g., 1% or more, the concentrated emulsion layer practically disappears. To avoid considerable growth of the concentration emulsion layer at the start, it is desirable under these conditions to keep the initial rate of introduction of the drops comparatively low. When the concentrated emulsion layer has been reduced on account of the formation of polymers, the rate of introduction can be increased.

The linear velocity of the drops when entering the water phase should preferably be not more than 30 cm. per second, and more preferably not more than 12 cm. per second. Increase of the linear speed beyond 30 cm. per second may decrease the size of the drops and impair the uniformity of the drops and consequently also impair the rate at which the drops separate from the water phase and join to form the integral phase.

The amount of the aqueous medium through which the drops of monomer are allowed to rise or fall may vary over a wide range. In most cases, the medium is so regulated as to permit a recovery of a great part of the drops in a separate phase at the opposite end of the reaction chamber. As the monomer is being consumed in the polymerization reaction in the aqueous medium, there will be some diffusion, e. g., about 0.1% to about 10%, of the monomer into the medium per pass and the remaining portion of the monomer will be recovered in each pass.

The monomer drops that pass through the aqueous medium are collected as a separate integral phase and then as further drops are collected a portion of that phase is widthdrawn and recycled back to the point of supply of the drops.

The recycling of the monomer may be accomplished in any suitable manner but is preferably accomplished by means of an outside conduit so that the monomer may be cooled before it is introduced into the reaction zone. As indicated above, this cooling of the recycled monomer outside of the reaction chamber offers a splendid opportunity for heat control of the polymerization reaction.

After some polymer, e. g., about 10% to 40%, and more preferably from 10% to 25% has been formed, portions of the polymer-containing aqueous phase are removed from the reaction chamber. The removal of the aqueous phase is accomplished by adding water, catalyst and other components and withdrawing portions of the aqueous medium, preferably at about the rate at which the polymer is being formed. The concentrations of catalyst and other components are preferably maintained substantially constant in the aqueous phase. This is conveniently accomplished by using as feed stock a mixture of water, catalyst, etc., having the components in the desired proportions. If desired, however, one or all of the components may be added separately from the aqueous feed.

Care should, of course, be taken during the operation of the process to maintain the pressure of the reaction chamber as constant as possible so that the fluctuations corrected by the buffer vessel should be as small as possible. This can be accomplished by using special care in removing and/or adding components to the reaction chamber. In case the monomer is used in the pressure vessel, the supply of monomer is preferably regulated in such a way that the interface of pressure vessel remains at the same level. The discharge of polymer-containing water phase is also preferably regulated so as to keep the interface of the aqueous phase at the desired level. The supply of fresh water aqueous phase is preferably regulated so that the concentration of polymer in the water phase in the reaction chamber remains substantially constant.

The process of the invention may be better understood by considering the accompanying drawing wherein Figs. I and II are diagrammatic representations of two embodiments of the process.

Fig. I represents an embodiment of the invention wherein the monomer phase is contacted with the liquid in the pressure vessel, the unsaturated monomer to be polymerized is lighter than water, and the liquid in the pressure vessel is the monomer itself. In that figure, the column-shaped reaction chamber 1 is partly filled with the water phase 2 and over that layer is monomer layer 3. Monomer in the form of drops ascend in the water phase 1 from distributing organ 4 and subsequently unite in monomer phase 3. The monomer is conducted from this layer through line 5 with pump 6 back to the bottom of the column where the monomer is again introduced into the water phase. A heat exchanger 7 is located in the recirculation line 5. Fresh monomer is supplied through conduit 8, and fresh water phase is supplied through conduit 9. The polymer suspension formed is discharged continuously or with interruptions through conduit 10. Recirculation line 5 is connected by conduit 11 to the pressure vessel 12 which is filled partially with liquid monomer and the rest of the space is filled with the monomer vapor. The conduit 11 must lead to the pressure vessel under the surface of the liquid which in this case is the monomer itself. In addition, means, such as steam coils, are supplied at the pressure vessel to maintain the temperature of the monomer in the vessel above the temperature in the reaction zone. If the monomer selected is, for example, vinyl chloride, the polymerization in the reaction zone may be carried out, say, at 45° C. while the temperature of the liquid in the pressure vessel is maintained at 48° C. The equilibrium pressure at 48° C. amounts to 7 atmospheres absolute. This pressure also prevails in the reaction chamber 1. The vapor pressure of vinyl chloride at 45° C. lies approximately 1 atmosphere lower.

In the above case, when any irregularity in supply or discharge of material results in a decrease or increase of the total volume of water phase and monomer phase, a change in pressure occurs. This however, causes the immediate evaporation or condensation of monomer in the pressure vessel 12 so that the fall in pressure is arrested.

Fig. II represents an embodiment of the invention wherein the water phase is contacted with the liquid in the pressure vessel, the unsaturated monomer to be polymerized is lighter than water, and the liquid in the pressure vessel is a non-polymerizable liquid which is lighter than the aqueous phase. Numbers 1 to 12 represent the same elements as in Fig. I. In this embodiment, the pressure vessel 12 is filled with a layer of water phase in the bottom, a layer of liquid on top of the water phase and then the rest of the space is filled with the vapor of the liquid. When any change in pressure takes place in this apparatus, the liquid in the pressure vessel will evaporate or condense as in the previous case and the pressure change will be arrested.

The process of the invention may be used for the polymerization of any substantially water-insoluble ethylenically unsaturated organic compound. While for convenience of description the singular expressions "compound" or "monomer" have been used herein, it is to be understood that the mixtures of compounds or monomers are equally applicable in the present process.

The expression "substantially water-insoluble" as used throughout the specification and claims in relation to the monomer to be polymerized, refers to those monomers which have at least some solubility in water so that some of the monomer may enter the aqueous medium but still have so little solubility in water that they are regarded as being relatively water-insoluble. Preferably, the monomers have a solubility in water at room temperature of from 0.1 part to 14 parts or 100 parts by weight of water. The expression "ethylenically unsaturated" as used herein refers to those monomers possessing at least one ethylenic group, i. e., a =C=C= group, in their molecule.

To take advantage of the improved feature of the process, at least one of the monomers utilized should be one that would be a gas at the polymerization temperature, e. g., 40° C. to 95° C., under atmospheric pressure, such as vinyl chloride and the like. If the process is used for copolymerization, the other monomer or monomers may be of this same type or may be liquid at the polymerization temperature. The monomers then may be used to copolymerize with the volatile monomers and may be exemplified by styrene, vinylidene chloride, acrylonitrile, methyl methacrylate, vinyl acetate, allyl chloride, methallyl chloride, and the like.

The composition of the aqueous medium to which the monomer is to be added may vary depending chiefly on the form in which the resulting polymer is desired. If the polymer is desired in the form of a stable emulsion, the medium may contain an emulsifying agent and a polymerization catalyst known to be effective with the emulsion-type system. If the mixture is desired as a dispersion from which the polymer may later settle out, the medium may contain a water-soluble catalyst and small quantities of dispersing agents.

Catalysts used for the emulsion polymerization may be any of the polymerization catalysts that are known to be used for this purpose, such as persulfuric acid, peracetic acid, percarbonic acid, perphosphoric acid, perphthalic acid, the persalts, such as potassium persulfate, the preresters, such as tert-butyl perbutyrate, ditertbutyl dipermalonate and O,O-tert-butyl O-ethyl monopermalonate, the peroxides, such as hydrogen peroxide, sodium peroxide and the like. Other catalysts can be used, such as benzoyl peroxide, tertiary butyl perbenzoate, acetyl benzoyl peroxide, lauryl peroxide, acetone peroxide, etc., if they form part of the well known redox systems of polymerization catalyzers, especially when operating at below about 35° C. Suitable catalyst systems are also combinations of oxygen and salts of sulfurous acid. The water-soluble polymerization catalysts, and more preferably the water-soluble peroxide polymerization catalysts, are the more desirable catalysts to be used for this type of process.

The preferred catalysts to be used for the suspension-type polymerization reaction include the above-described water-soluble catalysts, such as persulfuric acid, peracetic acid, percarbonic acid, perphosphoric acid, potassium persulfate, hydrogen peroxide, sodium peroxide, tert-butyl perbutyrate, and the like, and mixtures thereof.

The amount of the above-described catalysts to be used will vary over a wide range depending upon their type and desired rate of polymerization. In most instances, the amount of catalyst will vary from 0.1% to 5%, and more preferably from 0.1% to 1%, wherein the percentages are by weight based on the aqueous phase.

Dispersing agents that may be used in the process may be exemplified by the following: finely divided clay, talc, barium sulfate, and tricalcium phosphate, methyl cellulose, polyfluoroalkanoic acids, such as dodecafluoroheptanoic acid, pentadecafluorooctanoic acid, salts of these acids with saturated alkylamines, phosphoric acid esters of polyfluoroalkanols, and the like, and mixtures thereof.

Emulsifying agents used in the aqueous medium may be any of the known ionic or non-ionic type emulsifying materials. Suitable materials include sodium and/or potassium myristate, laurate, palmitate, oleate, stearate, rosinate and/or hydroabietate; or alkali metal alkyl or alkylene sulphates, or sulphonates, such as sodium and/or potassium lauryl sulfate, cetyl sulfate, oleyl sulphonate, stearyl sulphonate, sulphonated Turkey red oil, sulphonated mineral oils, etc., as well as ammonium or ethanolamine salts thereof; salts of higher amines and non-ionic emulsifiers such as described in U. S. 2,322,820. In all cases, it is preferred that the hydrocarbon radical of the emulsifying agent contains 10 to 20 carbon atoms. The amount of the emulsifying agents used may vary over a wide range. Best results are obtained when sufficient amount is present in the aqueous medium that the suspension of polymer is substantially stable. In general, the concentration of emulsifying agent falls within the range of about 0.05 to 2% of the aqueous medium. With an ion-active emulsifier, there is employed in general between 0.01 to 0.2, and more particularly between 0.01 and 0.06 gram equivalents of emulsifier per kilogram of polymer ultimately present in the dispersion. A gram equivalent is the number of grams which is equal to the molecular weight divided by the number of positive (or negative) elementary electric charges formed on ionization of a molecule. Thus, in using sodium cetyl sulphonate as emulsifying agent for production of an aqueous dispersion containing 20% polymer, there is used a starting aqueous medium containing about 0.08 to 1.6%, and more particularly 0.16% to 0.5% of the emulsifying agent.

As indicated above, the polymerization reaction is accomplished at any polymerizing temperature above the boiling point of the monomer or monomers being polymerized. The temperature should not, however, be so high as to cause excessive decomposition of the monomer or other components used in the reaction. The specific temperature ranges above the boiling point employed in each case will generally depend on the type of catalyst selected, desired rate of polymerization and the molecular weight of the finished product. Satisfactory rates using the conventional free radical forming catalysts are generally obtained by using temperatures ranging from about 5° C. above the boiling point to about 90° C. above the boiling temperature, and more preferably from 10° C. to 60° C. above the boiling temperature. When the monomer or monomers to be polymerized have rather low boiling points, such as −15° C. to +25° C., satisfactory rates are usually obtained with the peroxide catalysts by using polymerization temperatures ranging from 30° C. to 70° C. With the higher boiling monomers, satisfactory rates are usually obtained with the peroxide catalysts at temperatures ranging from 50° C. to 95° C.

As the temperature employed is above the boiling point of at least one of the monomers to be polymerized and that monomer or monomers should be maintained in the liquid phase, sufficient pressure should be employed to keep the monomer or monomers in this state. A safety margin should also be employed in order to help compensate for changes of pressure, such as those due to the removal of the monomer and/or aqueous phase. In most instances, a safety margin of from 2 to 8 atmospheres above that required to keep the monomer or monomers in the liquid state is generally satisfactory.

The method of recovering the polymer will vary depending upon the type of medium used. If the polymer is formed as a stable emulsion, the polymer particles may be recovered by any suitable coagulating means, such as freezing or addition of coagulating agents as salt and alcohols. If the polymer is formed as a less stable dispersion, the particles may be recovered by filtration, extraction, and the like.

As indicated above, the process of the invention can be used for the preparation of copolymers as well as homopolymers. The monomers used for the preparation of the copolymers may be any mixture of the above-described substantially water-insoluble monomers. The monomers may be combined in any desired ratio, but, in general, mixtures of monomers are employed wherein at least 1%, and more preferably 5%, of each is present in the drops introduced into the aqueous medium.

When using a mixture of monomers, the temperature used may be above the boiling point of only one of the monomers or above the boiling point of any mixture thereof. The pressure used is then sufficient to keep that monomer or mixture of monomers in the liquid state.

The process of the invention is particularly adapted for use in preparing copolymers of the homogeneous type, i. e., copolymers consisting of macromolecules which contain the monomer molecules in the same ratio. In general, different monomers, although they are present in the same concentration, are used up at different speeds in a copolymerization. The ratio in which the monomers are present in the reaction mixture consequently shows a tendency to change. An alteration in the ratio of the monomer concentration in the reaction mixture in turn results in the composition of the marcomolecules formed being subject to alteration, so that the copolymer becomes what is called heterogeneous.

It is known that in order to obtain homogeneous copolymers, the ratio of the monomers in the reaction mixture must be kept constant, which can best be attained by admixing suitable quantities of all participating monomers, or by admixing suitable quantities of all monomers with the exception of the monomer which in proportion to the total quantity of that particular monomer present, is consumed most slowly. In the process according to the invention, this admixture can take place most efficiently in the monomer circulation line. Preferably a reservoir will be fitted in the circulation line in this case. The admixture of monomer then takes place preferably in this reservoir or in the part of the circulation line in front of the reservoir. When applying a reservoir the monomer can be admixed both continuously and intermittently.

The process of the invention is particularly adapted for use in preparing the above-described homogeneous copolymers as it provides excellent means for effecting control over concentration of the individual monomers in the aqueous phase.

The following example illustrates the preparation of poly(vinyl chloride) using an apparatus similar to the one shown in Fig. I of the attached drawing.

The reaction chamber consisted of a vertically arranged tube of stainless steel. The bottom of the tube contained a distributing device having five upward directing nozzles. A stainless steel recirculation line connected the top of the tube to the bottom distributing device. A heat exchanger and centrifugal pump were located in that order in the recirculation line. A stainless steel conduit joined the recirculation line near the top with a stainless steel pressure vessel as shown in Figure I.

The reaction chamber was partially filled with 100 liters of an aqueous solution containing 1.0% sodium mersolate, 0.4% potassium persulfate and 0.3% sodium bicarbonate. The liquid vinyl chloride was introduced into the aqueous phase, collected as a separate monomer layer above the aqueous phase and then allowed to pass into the pressure vessel to partially fill the said vessel. The vinyl chloride in the pressure vessel was then heated to 48° C. and the aqueous solution in the reaction chamber was heated to 45° C. The liquid surface in the pressure vessel was 5 sq. dm. and the volume of the vapor was 10 liters. The pressure in the vessel and in the reaction chamber was seven atmospheres absolute. The temperature of the circulating monomer was maintained at 44° C. to 45° C. by cooling with cold water in the heat exchanger. The pressure was maintained at the desired level by regular supply of liquid vinyl chloride.

After the polymer concentration in the aqueous phase had come up to 25% by weight, the process was made continuous by the following measures: (1) regular supply of water phase of the initial composition to the reaction chamber so as to keep the concentration of polymer in the water phase constant at 25% w., (2) intermittent discharge of the polymer-containing aqueous phase from the reaction chamber to keep the interface of the water phase and monomer layer at the same level, and (3) regulation of the supply of vinyl chloride so as to keep the interface in the pressure vessel at the same level.

When operating in the above-described manner, it was found that there was no monomer vapor formed in the reaction chamber due to the pressure fluctuations and there was an improved separation of the liquid vinyl chloride from the water phase to the monomer phase.

The apparatus described above may also be used to produce a homogeneous copolymer of vinyl chloride and vinylidene chloride. The start up and operating procedure is the same with the exception that the initial monomer mixture employed is a mixture containing vinyl chloride and vinylidene chloride in a ratio of 95:5 and during the polymerization the monomer mixture is supplied in a ratio of 80 vinyl chloride and 20 vinylidene chloride. The copolymer removed from the reaction chamber has the vinyl chloride and vinylidene chloride in a ratio of 80 to 20.

There is also no monomer vapor formed during the operation of this process and there is very good separation of the vinyl chloride-vinylidene chloride mixture from the water phase to the monomer phase.

I claim as my invention:

1. In a process for producing a polymer of at least one substantially water-insoluble ethylenically unsaturated compound in an aqueous medium wherein liquid drops of the said compound are passed through an aqueous medium containing a polymerization catalyst and being maintained at a polymerizing temperature which is above the boiling point at atmospheric pressure of at least one of the unsaturated compounds and being maintained at a pressure such that the unsaturated compound is in the liquid state, said passage of drops through the medium being due primarily to difference in density of said drops and the medium, and wherein the drops of monomer are collected as a separate phase in contact with the aqueous medium at the end of their passage through the medium and a portion of the monomer phase then being recycled back to the point of supply of the drops, and wherein a portion of the polymer-containing aqueous medium is withdrawn, the improvement which comprises establishing and maintaining contact between the continuously recycling liquid monomer and stationary liquid monomer in an enclosed volume wherein the stationary monomer is in equilibrium with its own vapor and is maintained at a temperature which is above the temperature of the aqueous phase and at which the equilibrium pressure is 1 to 8 atmospheres above the vapor pressure of the monomer at the temperature of the aqueous phase.

2. The improvement as defined in claim 1 wherein the ethylenically unsaturated compound is vinyl chloride.

3. A process for producing a polymer of a substantially water-insoluble ethylenically unsaturated monomer which would be a gas at a polymerizing temperature between 40° C. and 95° C. at atmospheric pressure, which comprises passing liquid drops of the ethylenically unsaturated compounds through an aqueous medium containing a water-soluble free-radical yielding polymerization catalyst and an emulsifying agent and being maintained at a polymerizing temperature between 40° C. and 95° C. which is above the boiling point at atmospheric pressure of the said ethylenically unsaturated monomer and being maintained at a pressure such that the unsaturated monomer is in the liquid state, said passage of the drops through the medium being due primarily to difference in density of the drops and the medium, and said passage being regulated so as to permit a recovery of at least 90% of the ethylenically unsaturated compound at the opposite end of the reaction chamber, collecting the drops at the end of their passage through the aqueous medium as a separate monomer phase in contact with the aqueous medium, and as further drops collect, withdrawing a portion of the monomer, adding fresh unsaturated monomer thereto as needed and recycling the mixture back to the point of supply of the drops, establishing and maintaining contact between the continuously recycling liquid monomer and stationary liquid monomer in an enclosed volume wherein the stationary monomer is in equilibrium with its own vapor and is maintained at a temperature which is above the temperature of the aqueous phase and at which the equilibrium pressure is 1 to 8 atmospheres above the vapor pressure of the monomer at the temperature of the aqueous phase, then discharging a portion of the polymer containing aqueous phase, adding fresh ethylenically unsaturated monomer in the recycle line to make up for that polymerized and adding fresh aqueous phase to make up for that withdrawn with the polymer, the addition of the ethylenically unsaturated compound being regulated so as to maintain the interface in the enclosed volume wherein the monomer is in equilibrium with its own vapor at the same level and said addition of the aqueous phase being regulated so as to keep the interface of the aqueous phase at the desired level.

4. A process for producing a relatively homogeneous copolymer of two substantially water-insoluble ethylenically unsaturated compounds which comprises passing liquid drops of the two unsaturated compounds through an aqueous medium containing a water-soluble polymerization catalyst and an emulsifying agent and being maintained at a polymerizing temperature which is above the boiling point at atmospheric pressure of at least one of the unsaturated compounds and being maintained at a pressure such that the unsaturated compound is in the liquid state, said passage of the drops of monomer through the medium being due primarily to difference in density of the drops and the medium, collecting the drops of monomer at the other side of the reaction vessel as a separate phase in contact with the aqueous phase, and as further drops collect, withdrawing a portion of the monomer, adding a fresh mixture of monomers in the ratio in which they appear in the finished copolymer to the recycle line where the mixture is taken to the point of supply of drops to the reaction chamber, establishing and maintaining contact between the continuously recycling liquid monomer and stationary liquid monomer in an enclosed volume wherein the stationary monomer is in equilibrium with its own vapor and is maintained at a temperature which is above the temperature of the aqueous phase and at which the equilibrium pressure is 1 to 8 atmospheres above the vapor pressure of the monomer at the temperature of the aqueous phase, then discharging a portion of the polymer-containing aqueous phase, adding fresh ethylenically unsaturated monomer in the recycle line to make up for that polymerized and adding fresh aqueous phase to make up for that withdrawn with the polymer, the addition of the ethylenically unsaturated compound being regulated so as to maintain the interface in the enclosed volume wherein the monomer is in equilibrium with its own vapor at the same level and said addition of the aqueous phase being regulated so as to keep the interface of the aqueous phase at the desired level.

5. Claim 4 wherein the monomers are vinyl chloride and vinylidene chloride.

References Cited in the file of this patent

UNITED STATES PATENTS 2,618,626    Van Dijk    Nov. 18, 1952

FOREIGN PATENTS 331,265    Great Britain    June 23, 1950

OTHER REFERENCES

Van Nostrand Scientific Encyclopedia, 2nd ed., 1947, page 1426.

Haslam et al.: Fuels and Their Combustion, McGraw-Hill, 1926, pages 469–472.

Althouse et al.: Modern Electric and Gas Refrigeration, Goodheart-Wilcox Co., 1950, pages 426–430.